US012314653B2

(12) United States Patent
Maeda et al.

(10) Patent No.: US 12,314,653 B2
(45) Date of Patent: May 27, 2025

(54) SEMICONDUCTOR PROCESS MODELING SYSTEM AND METHOD

(71) Applicant: Samsung Electronics Co., Ltd., Suwon-si (KR)

(72) Inventors: Shigenobu Maeda, Seongnam-si (KR); Wook Kim, Yongin-si (KR); Hongsik Kim, Seoul (KR); Heejun Kim, Yongin-si (KR); Seyoung Park, Seoul (KR); Seongjin Yoo, Suwon-si (KR); Minhong Yun, Hwaseong-si (KR); Daehan Han, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 661 days.

(21) Appl. No.: 17/700,825

(22) Filed: Mar. 22, 2022

(65) Prior Publication Data

US 2023/0010252 A1 Jan. 12, 2023

(30) Foreign Application Priority Data

Jul. 7, 2021 (KR) ........................ 10-2021-0089329

(51) Int. Cl.
*G06F 30/398* (2020.01)
*G06F 30/27* (2020.01)
*G06F 119/18* (2020.01)

(52) U.S. Cl.
CPC ............ *G06F 30/398* (2020.01); *G06F 30/27* (2020.01); *G06F 2119/18* (2020.01)

(58) Field of Classification Search
CPC ..... G06F 30/398; G06F 30/27; G06F 2119/18
(Continued)

(56) References Cited

U.S. PATENT DOCUMENTS

| | | | |
|---|---|---|---|
| 7,949,618 | B2 | 5/2011 | Bischoff et al. |
| 10,650,910 | B2 | 5/2020 | Jeong et al. |

(Continued)

FOREIGN PATENT DOCUMENTS

| | | | |
|---|---|---|---|
| KR | 101917006 | B1 | 11/2018 |
| KR | 1020190081691 | A | 7/2019 |

(Continued)

OTHER PUBLICATIONS

Notice Of Allowance, dated Jun. 25, 2024, for corresponding TW Patent Application No. 111117643.

*Primary Examiner* — Jack Chiang
*Assistant Examiner* — Suchin Parihar
(74) *Attorney, Agent, or Firm* — Muir Patent Law, PLLC

(57) ABSTRACT

Provided is a semiconductor process modeling system. The semiconductor process modeling system includes a preprocessing component configured to generate tensor data from raw data obtained from semiconductor manufacturing equipment, wherein, when the raw data is expressed as a raw matrix representing values of a plurality of process parameters for each of a plurality of wafers, at least one element of the raw matrix is omitted, when the tensor data is expressed as a tensor matrix representing values of a plurality of preprocessed process parameters for each of the plurality of wafers, the number of omitted elements of the tensor matrix is less than the number of omitted elements of the raw matrix, and the preprocessing component is configured to generate the tensor data by modifying the raw data based on at least one of characteristics of the semiconductor manufacturing equipment and characteristics of the plurality of process parameters.

20 Claims, 31 Drawing Sheets

(58) Field of Classification Search
USPC .......................................................... 716/100
See application file for complete search history.

(56) References Cited

U.S. PATENT DOCUMENTS

| | | | | |
|---|---|---|---|---|
| 2005/0252884 | A1* | 11/2005 | Lam | H01L 22/20 156/345.24 |
| 2014/0031969 | A1* | 1/2014 | Baseman | G05B 13/048 700/121 |
| 2014/0089871 | A1 | 3/2014 | Hou et al. | |
| 2018/0247798 | A1 | 8/2018 | Guha et al. | |
| 2019/0129297 | A1 | 5/2019 | Shim | |
| 2019/0278684 | A1 | 9/2019 | Dede et al. | |
| 2019/0286983 | A1 | 9/2019 | Jung et al. | |
| 2019/0385047 | A1 | 12/2019 | Lei et al. | |
| 2020/0082245 | A1 | 3/2020 | Hao et al. | |
| 2020/0125044 | A1* | 4/2020 | Ide | G06N 20/00 |
| 2020/0394526 | A1 | 12/2020 | Kim et al. | |
| 2020/0410330 | A1* | 12/2020 | Liu | G06F 9/38885 |
| 2021/0117806 | A1* | 4/2021 | Liu | G06F 17/16 |
| 2022/0254666 | A1* | 8/2022 | Sadeghi | H01L 21/68742 |
| 2022/0261696 | A1* | 8/2022 | Jin | G06F 16/951 |
| 2022/0374498 | A1* | 11/2022 | Jeong | G06F 17/16 |
| 2023/0029163 | A1* | 1/2023 | Kim | G06N 3/0464 |
| 2023/0280719 | A1* | 9/2023 | Samuels | H01J 37/3299 700/266 |
| 2024/0274453 | A1* | 8/2024 | Yun | G05B 13/027 |

FOREIGN PATENT DOCUMENTS

| | | | |
|---|---|---|---|
| KR | 1020200085490 | A | 7/2020 |
| TW | 200928843 | A | 7/2009 |
| WO | 2020205339 | A1 | 10/2020 |
| WO | 2021030833 | A1 | 2/2021 |

* cited by examiner

| | T11(℃) | T12(℃) | T2(℃) | T3(℃) | t4 (nm) | Δt4 (nm) |
|---|---|---|---|---|---|---|
| WF1 | 1000 | | 1000 | | 12 | |
| WF2 | | 1050 | | | 13 | 1 |
| WF3 | 1100 | | 1100 | | 15 | 3 |
| WF4 | | 1150 | | | 13 | 1 |
| WF0 | | | | 1000 | | |

| | T1(℃) | T2(℃) | T3(℃) | t4 (nm) | Δt4 (nm) |
|---|---|---|---|---|---|
| WF1 | 1000 | 1000 | 1000 | 12 | |
| WF2 | 1050 | | 1000 | 13 | 1 |
| WF3 | 1000 | 1100 | 1000 | 15 | 3 |
| WF4 | 1050 | | 1000 | 13 | 1 |

| | T1(℃) | T2(℃) | T3(℃) | t4 (nm) |
|---|---|---|---|---|
| WF1 | 1000 | 1000 | 1000 | 12 |
| WF2 | 1050 | 1000 | 1000 | 13 |
| WF3 | 1100 | 1100 | 1100 | 15 |
| WF4 | 1150 | 1100 | 1000 | 13 |

| | T11(℃) | T12(℃) |
|---|---|---|
| WF1 | 1000 | |
| WF2 | | 1050 |
| WF3 | 1100 | |
| WF4 | | 1150 |

| | T1(℃) |
|---|---|
| WF1 | 1000 |
| WF2 | 1050 |
| WF3 | 1100 |
| WF4 | 1150 |

| | T2(℃) |
|---|---|
| WF1 | 1000 |
| WF2 | |
| WF3 | 1100 |
| WF4 | |

| | T2'(℃) |
|---|---|
| WF1 | 1000 |
| WF2 | 1000 |
| WF3 | 1100 |
| WF4 | 1100 |

| | T3(℃) |
|---|---|
| WF0 | 1000 |

| | T3'(℃) |
|---|---|
| WF1 | 1000 |
| WF2 | 1000 |
| WF3 | 1000 |
| WF4 | 1000 |

| | t4 (nm) | Δt4 (nm) |
|---|---|---|
| WF1 | 12 | |
| WF2 | 13 | 1 |
| WF3 | 15 | 3 |
| WF4 | 13 | 1 |

| | t4 (nm) |
|---|---|
| WF1 | 12 |
| WF2 | 13 |
| WF3 | 15 |
| WF4 | 13 |

SEMICONDUCTOR PROCESS MODELING SYSTEM AND METHOD

CROSS-REFERENCE TO RELATED APPLICATION

This application is based on and claims priority under 35 U.S.C. § 119 to Korean Patent Application No. 10-2021-0089329, filed on Jul. 7, 2021, in the Korean Intellectual Property Office, the disclosure of which is incorporated by reference herein in its entirety.

BACKGROUND

The inventive concept relates to a semiconductor process modeling system and method, and more particularly, to a semiconductor process modeling system and method including a preprocessing component and method.

By measuring process parameters using sensors in a semiconductor manufacturing process, raw data may be generated. By monitoring such raw data, malfunction of semiconductor manufacturing equipment may be detected, and by modeling the semiconductor process using the raw data, process result values may be predicted. However, due to different process parameter measurement regulations of sensors in semiconductor manufacturing equipment, when the raw data is expressed as a matrix representing values of a plurality of process parameters for each wafer, multiple elements of the matrix may be omitted. A model generated based on raw data having omitted elements may have a low accuracy.

SUMMARY

The inventive concept provides a semiconductor process modeling system and method that facilitates easy and accurate process modeling, and a semiconductor manufacturing system including the semiconductor process modeling system.

According to an aspect of the inventive concept, there is provided a semiconductor process modeling system including a preprocessing component configured to generate tensor data from raw data obtained from semiconductor manufacturing equipment, wherein, when the raw data is expressed as a raw matrix representing values of a plurality of process parameters for each of a plurality of wafers, at least one element of the raw matrix is omitted, wherein, when the tensor data is expressed as a tensor matrix representing values of a plurality of preprocessed process parameters for each of the plurality of wafers, the number of omitted elements of the tensor matrix is less than the number of omitted elements of the raw matrix, and wherein the preprocessing component is configured to generate the tensor data by modifying the raw data based on at least one of characteristics of the semiconductor manufacturing equipment and characteristics of the plurality of process parameters.

According to another aspect of the inventive concept, there is provided a semiconductor manufacturing system including: semiconductor manufacturing equipment configured to process a plurality of wafers; and a semiconductor process modeling system, wherein the semiconductor process modeling system includes: a preprocessing component configured to generate tensor data from raw data obtained from the semiconductor manufacturing equipment; and a modeling component configured to model a semiconductor process by using the tensor data, wherein, when the raw data is expressed as a raw matrix representing values of a plurality of process parameters for each of the plurality of wafers, at least one element of the raw matrix is omitted, and wherein, when the tensor data is expressed as a tensor matrix representing values of a plurality of preprocessed process parameters for each of the plurality of wafers, the number of omitted elements of the tensor matrix is less than the number of omitted elements of the raw matrix, and wherein the preprocessing component is configured to generate the tensor data by modifying the raw data based on at least one of characteristics of the semiconductor manufacturing equipment and characteristics of the plurality of process parameters.

According to another aspect of the inventive concept, there is provided a semiconductor process modeling method, the method including: obtaining raw data including values of a plurality of process parameters from semiconductor manufacturing equipment; and generating tensor data by modifying the raw data based on at least one of characteristics of the semiconductor manufacturing equipment and characteristics of the plurality of process parameters, wherein when the raw data is expressed as a raw matrix representing values of a plurality of process parameters for each of a plurality of wafers, at least one element of the raw matrix is omitted, and wherein, when the tensor data is expressed as a tensor matrix representing values of a plurality of preprocessed process parameters for each of the plurality of wafers, the number of omitted elements of the tensor matrix is less than the number of omitted elements of the raw matrix.

BRIEF DESCRIPTION OF THE DRAWINGS

Embodiments of the inventive concept will be more clearly understood from the following detailed description taken in conjunction with the accompanying drawings in which like numerals correspond to like elements throughout. In the drawings:

FIG. 2 is a diagram of raw data, according to example embodiments;

FIG. 3 is a diagram of tensor data, according to example embodiments;

FIG. 4 is a diagram of tensor data, according to example embodiments;

FIG. 8 is a diagram of raw data generated by the operations of FIG. 7;

FIG. 9 is a diagram of tensor data generated by the operations of FIG. 7;

FIG. 11 is a diagram of raw data generated by the operations of FIG. 10;

FIG. 12 is a diagram of tensor data generated by the operations of FIG. 10;

FIG. 14 is a diagram of raw data generated by the operations of FIG. 13;

FIG. 15 is a diagram of tensor data generated by the operations of FIG. 13;

FIG. 17 is a diagram of raw data generated by the operations of FIG. 16;

FIG. 18 is a diagram of tensor data generated by the operations of FIG. 14;

DETAILED DESCRIPTION OF THE EMBODIMENTS

Figure 1:
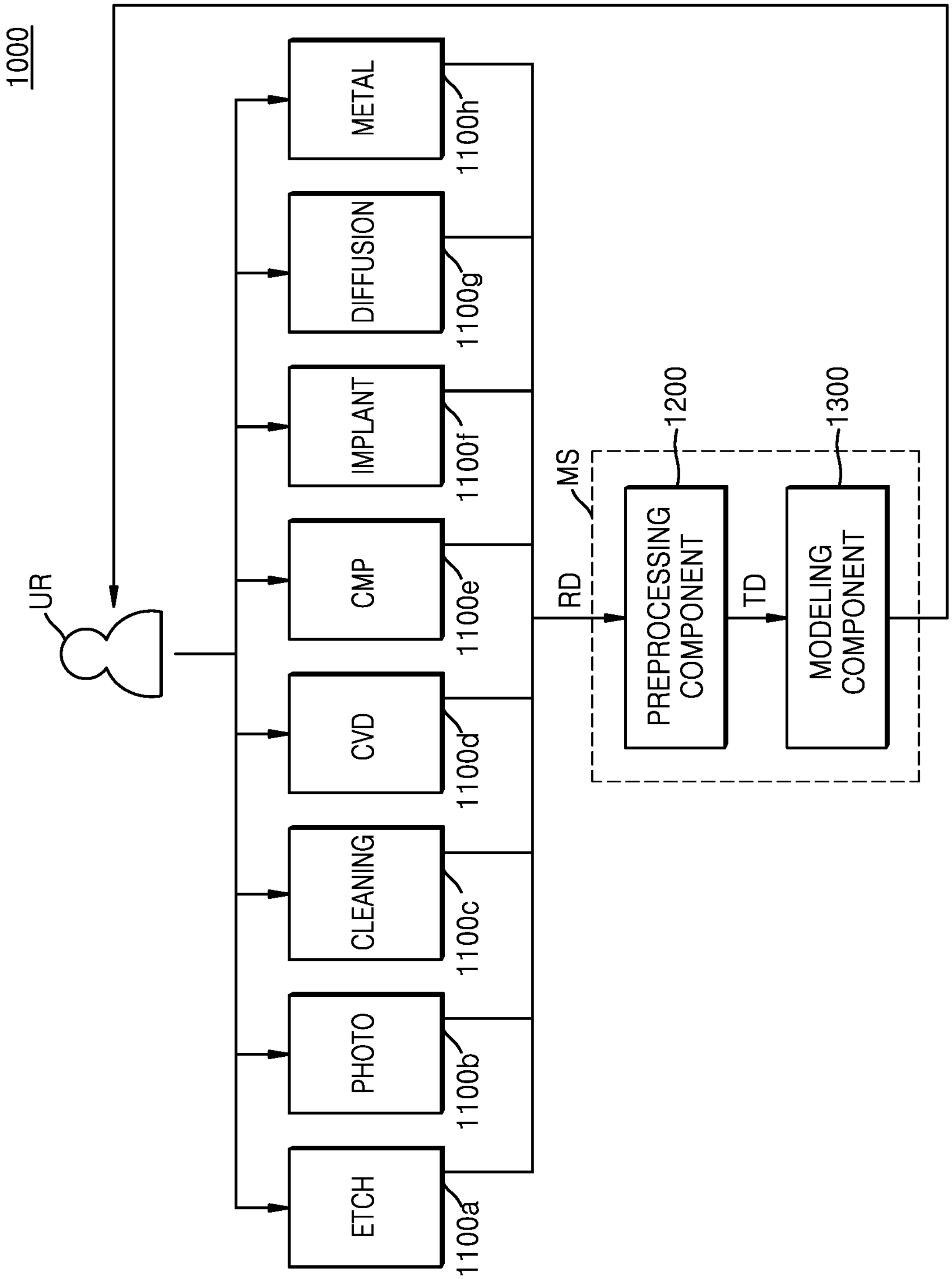
FIG. 1 is a block diagram of a semiconductor manufacturing system, according to example embodiments.

FIG. 1 is a block diagram of a semiconductor manufacturing system 1000 according to example embodiments.

With reference to FIG. 1, the semiconductor manufacturing system 1000 according to example embodiments may include first to eighth semiconductor manufacturing equipment 1100*a* to 1100*h* and a semiconductor process modeling system MS. Although FIG. 1 illustrates that the semiconductor manufacturing system 1000 includes eight manufacturing equipment, i.e., the first to eighth semiconductor manufacturing equipment 1100*a* to 1100*h*, the number of semiconductor manufacturing equipment may be any natural number. The first to eighth semiconductor manufacturing equipment 1100*a* to 1100*h* may exemplify numerous semiconductor manufacturing equipment used in a semiconductor process.

In some embodiments, the first semiconductor manufacturing equipment 1100*a* may include etching equipment. The first semiconductor manufacturing equipment 1100*a* may be configured to remove at least some portion of a wafer or a material layer on a wafer. The first semiconductor manufacturing equipment 1100*a* may include at least one of dry etching equipment and wet etching equipment.

In some embodiments, the second semiconductor manufacturing equipment 1100*b* may include photolithography equipment. The second semiconductor manufacturing equipment 1100*b* may be configured to form a photoresist pattern on a wafer. For example, the second semiconductor manufacturing equipment 1100*b* may form a photoresist layer on a wafer, partially expose the photoresist layer to light, and partially remove the photoresist layer. The second semiconductor manufacturing equipment 1100*b* may include at least one of photoresist coating equipment (e.g., spin coating equipment), light exposure equipment, and development equipment.

In some embodiments, the third semiconductor manufacturing equipment 1100*c* may include cleaning equipment. The third semiconductor manufacturing equipment 1100*c* may be configured to remove residues or pollutants on a wafer or a material layer on a wafer. The third semiconductor manufacturing equipment 1100*c* may include at least one of wet cleaning equipment, dry cleaning equipment, and steam cleaning equipment.

In some embodiments, the fourth semiconductor manufacturing equipment 1100*d* may include chemical vapor deposition (CVD) equipment. The fourth semiconductor manufacturing equipment 1100*d* may be configured to form a material layer on a wafer by using a CVD method. The fourth semiconductor manufacturing equipment 1100*d* may include at least one of thermo-CVD equipment, plasma CVD equipment, and photo-CVD equipment. Although not illustrated, in addition to the chemical vapor deposition (CVD) equipment included in the fourth semiconductor manufacturing equipment 1100*d*, the fourth semiconductor manufacturing equipment 1100*d* may further include at least one of physical vapor deposition (PVD) equipment, atomic layer deposition (ALD) equipment, and electrical plating equipment.

In some embodiments, the fifth semiconductor manufacturing equipment 1100*e* may include chemical physical polish (CMP) equipment. The fifth semiconductor manufacturing equipment 1100*e* may planarize or remove a wafer or a material layer on a wafer by polishing the wafer or the material layer on the wafer.

In some embodiments, the sixth semiconductor manufacturing equipment 1100*f* may include ion implant equipment. The sixth semiconductor manufacturing equipment 1100*f* may be configured to inject impurity ions into a wafer or a material layer on a wafer. The impurity ions may include at least one of Group 15 elements and Group 13 elements. The Group 15 elements may include phosphorus (P), arsenic (AS), or combinations thereof. The Group 13 elements may include boron (B).

In some embodiments, the seventh semiconductor manufacturing equipment 1100*g* may include diffusion equipment. The seventh semiconductor manufacturing equipment 1100*g* may be configured to diffuse impurity ions in a wafer or a material layer on a wafer.

In some embodiments, the eighth semiconductor manufacturing equipment 1100*h* may include metallization equipment. The eighth semiconductor manufacturing equipment 1100*h* may be configured to form a metal wire on a wafer.

Each of the first to eighth semiconductor manufacturing equipment 1100*a* to 1100*h* may sequentially process wafers. The first to eighth semiconductor manufacturing equipment 1100*a* to 1100*h* may include at least one sensor measuring at least one process parameter. For example, each of the first to eighth semiconductor manufacturing equipment 1100*a* to 1100*h* may include at least one of a temperature sensor, a pressure sensor, a flux sensor, a humidity sensor, a pH sensor, a position sensor, a power sensor, a voltage sensor, and a current sensor.

The semiconductor process modeling system MS may be configured to generate tensor data TD from raw data RD including values of a plurality of process parameters obtained from sensors of the first to eighth semiconductor manufacturing equipment 1100*a* to 1100*h*, and model a semiconductor process based on the tensor data TD. The semiconductor process modeling system MS may include a preprocessing component 1200 and a modeling component 1300 executed by a computer system.

The preprocessing component 1200 may be configured to generate tensor data TD from raw data RD obtained from the first to eighth semiconductor manufacturing equipment 1100*a* to 1100*h*. The preprocessing component 1200 may be configured to generate tensor data TD by modifying raw data RD based on at least one of characteristics of the first to eighth semiconductor manufacturing equipment 1100*a* to 1100*h* and characteristics of a plurality of process parameters.

The modeling component 1300 may model a semiconductor process to predict a process result value based on the tensor data TD. Here, the process result may be, for example, a yield, width of pattern, length of pattern, diameter of pattern, diameter of hole, depth of hole, standard deviation of dimension of a pattern, etc. In some embodiments, machine learning may be used in semiconductor process modeling. In such cases, the modeling component 1300 may train a machine learning model for prediction of process result values based on the tensor data TD.

A user UR may control, change, and/or adjust at least one of the first to eighth semiconductor manufacturing equipment 1100*a* to 1100*h* based on a model generated by the modeling component 1300 of the semiconductor process modeling system MS. For example, the user UR may control, change, and/or adjust at least one of the first to eighth semiconductor manufacturing equipment 1100*a* to 1100*h* to achieve a desired process result value. For example, to improve a yield the user UR may find a process parameter which most greatly affects the yield, and then control, change, and/or adjust at least one of the first to eighth semiconductor manufacturing equipment 1100*a* to 1100*h* to change the process parameter.

FIG. 2 is a diagram of raw data RD according to example embodiments.

With reference to FIG. 2, the raw data RD may be expressed as a raw matrix representing values of a plurality of process parameters P for each of a plurality of wafers WF (e.g., first to fourth wafers WF1 to WF4) and a lot WF0, which may include the first to fourth wafers WF1 to WF4. The values of the process parameters P may include, for example, temperatures T11, T12, T2, and T3, a thickness t4, and a thickness difference Δt4. Although not illustrated, the process parameters P may further include a pressure, flux rate, pH, humidity, illuminance, time, voltage, power, current, etc. As shown in FIG. 2, some elements FC of a raw matrix may have a value while other elements EC of the raw matrix may not have a value. That is, some elements FC of the raw matrix may be filled while other elements EC of the raw matrix may be omitted.

When a constant value, e.g., 0, is arbitrarily inserted into omitted data, or modeling is carried out only with filled data FC, the modeling is performed based on distorted data, which may lead to performance degradation of a semiconductor process model. To fill data with a meaningful value, understanding of characteristics of equipment to which measured parameters pertain and characteristics of the measured parameters is required. Thus, performing modeling by using such raw data RD in equipment may not be easy to non-experts.

FIG. 3 is a diagram of tensor data TD according to example embodiments.

With reference to FIG. 3, the tensor data TD may be expressed as a tensor matrix representing values of a plurality of preprocessed process parameters P' for each of a plurality of wafers WF (e.g., first to fourth wafers W1 to W4). The values of the preprocessed process parameters P' may be calculated from values of the process parameters P of the raw data RD. Some elements FC' of the tensor matrix may have a value while other elements EC' of the tensor matrix may not have a value as shown in FIG. 3. For example, some elements FC' of the tensor matrix may be filled while other elements EC' of the tensor matrix may be omitted. However, the number of omitted elements EC' of the tensor matrix may be less than the number of omitted elements EC of the raw matrix RD of FIG. 2. For example, the number of omitted elements EC' of the tensor matrix of FIG. 3 is 3, and the number of omitted elements EC of the raw matrix of FIG. 2 is 16.

Among the plurality of preprocessed process parameters P', the preprocessed process parameters T1, T3, and t4 having a corresponding value for each of the wafers WF may be defined as being tensorized. On the other hand, some parameters T2 and Δt4 of the plurality of preprocessed process parameters P' may not be tensorized. The tensorization rate may be defined as "(the number of tensorized preprocessed process parameters)/(the number of all preprocessed process parameters)×100." In the example of FIG. 3, the tensorization rate is (3/5)×100=60%. When modeling of a semiconductor process is performed based on the tensor data TD, performance of the semiconductor process model may be improved. For example, a model may better predict a process result value from at least one of a plurality of preprocessed process parameters P'.

FIG. 4 is a diagram of tensor data TD0 according to example embodiments.

With reference to FIG. 4, the tensor data TD0 may be expressed as a tensor matrix representing values of a plurality of preprocessed process parameters P0' for each of a plurality of wafers WF (e.g., first to fourth wafers W1 to W4). All elements of the tensor matrix may be filled. That is, the number of omitted elements of the tensor matrix may be 0. In other words, the tensor matrix may not include an omitted element. For example, the tensor data TD0 may be completely tensorized, and the tensorization rate of the tensor data TD0 may be 100%. When modeling of a semiconductor process is performed based on the tensor data TD0, performance of the model may be improved. For example, a model may better predict a process result value from at least one of a plurality of preprocessed process parameters P0'. As there is no omitted element, non-experts may also easily perform modeling of the semiconductor process by using the tensor data TD0 and the modeling component 1300 (see FIG. 1).

Figure 5:
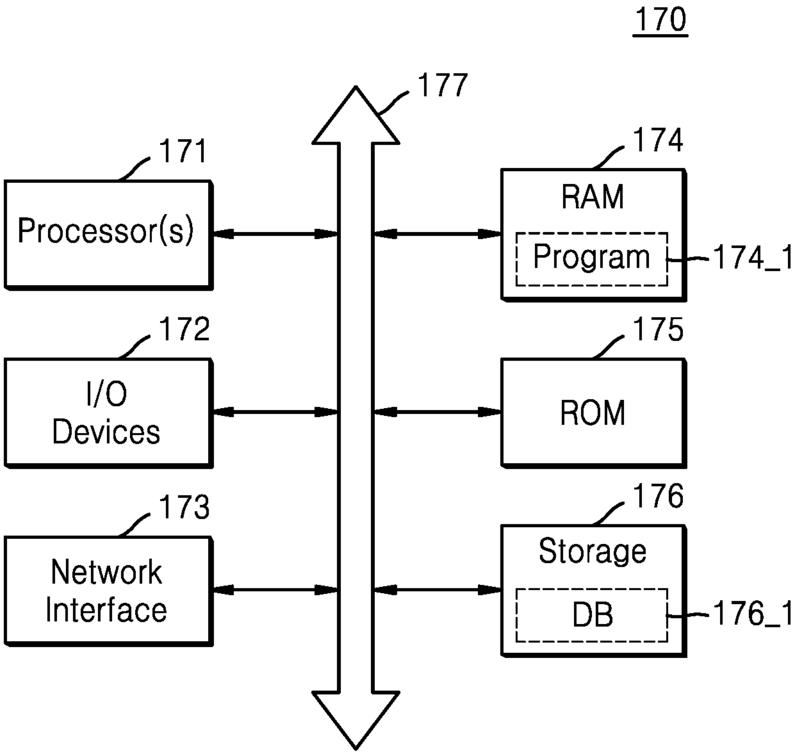
FIG. 5 is a block diagram of a computer system, according to example embodiments.

FIG. 5 is a block diagram of a computer system 170 according to example embodiments. A semiconductor process modeling method, which is described with reference to FIGS. 25 to 31, may be performed in the computer system 170. In some embodiments, the computer system 170 may be referred to as a semiconductor process modeling system MS (see FIG. 1).

The computer system 170 may include at least one computing device. For example, the computer system 170 may include a first computing device where the preprocessing component 1200 of FIG. 1 is executed and a second computing device where the modeling component 1300 of FIG. 1 is executed. In another embodiment, the preprocessing component 1200 and the modeling component 1300 may be executed in the same computing device. The computing device may be a fixed computing device, such as a desktop computer, a workstation, a server, etc., or may be a portable computing device, such as a laptop computer, a tablet, a smartphone, etc.

As shown in FIG. 5, the computer system 170 may include a processor 171, input/output (I/O) devices 172, a network interface 173, random access memory (RAM) 174, read only memory (ROM) 175, and a storage 176. The processor 171, the I/O devices 172, the network interface 173, the RAM 174, the ROM 175, and the storage 176 may be connected to a bus 177, and communicate with each other through the bus 177.

The processor 171 may be referred to as a processing unit, and may include at least one core capable of executing a command set (e.g., Intel Architecture (IA)-32, 64 bit extension IA-32, x86-64, PowerPC, Sparc, MIPS, ARM, IA-64, etc.), such as a micro-processor, an application processor (AP), a digital signal processor (DSP), and a graphics processing unit (GPU). For example, the processor 171 may access the memory, i.e., RAM 174, or ROM 175 through the bus 177, and execute commands stored in the RAM 174 or ROM 175.

The RAM 174 may store a program 174_1 for semiconductor process modeling or at least a portion thereof, and the program 174_1 for semiconductor process modeling may make the processor 171 perform a semiconductor process modeling method. For example, the program 174_1 may include a plurality of commands executable by the processor 171, and the plurality of commands included in the program 174_1 may make the processor 171 perform a semiconductor process modeling method.

The storage 176 may not lose stored data even when the power supplied to the computer system 170 is cut. For example, the storage 176 may include a non-volatile memory device, or may include a storage medium such as a magnetic tape, an optical disk, and a magnetic disk. Further, the storage 176 may be removable from the computer system 170. The storage 176 may store the program 174_1 according to an example embodiment of the inventive concept, and the program 174_1 or at least a portion thereof may be loaded to the RAM 174 from the storage 176 before the program 174_1 is executed by the processor 171. Alternatively, the storage 176 may store a file written in a program language, and the program 174_1 generated by a compiler, etc. or at least a portion thereof may be loaded to the RAM 174 from the file. As shown in FIG. 5, the storage 176 may store a database 176_1, and the database 176_1 may include data required for semiconductor process modeling, for example, the raw data RD of FIG. 1.

The storage 176 may store data to be processed by the processor 171 or data processed by the processor 171. For example, the processor 171 may generate data by processing data stored in the storage 176 according to the program 174_1, and store the generated data, for example, the tensor data TD of FIG. 1 and predictive values of a process result in the storage 176.

The I/O devices 172 may include an input device such as a keyboard, a pointing device, etc., and may include an output device such as a display device, a printer, etc. For example, a user may trigger execution of the program 174_1 by the processor 171 through the I/O devices 172, and check the resulting data.

The network interface 173 may provide access to a network outside the computer system 170. For example, a network may include multiple computing systems and communication links, and the communication links may include wired links, optical links, wireless links, or any other types of links.

Figure 6:
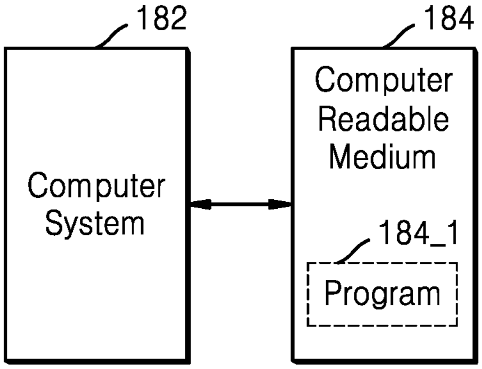
FIG. 6 is a block diagram of a computer system accessing a computer-readable medium, according to example embodiments.

FIG. 6 is a block diagram of a computer system 182 accessing a computer-readable medium 184 according to example embodiments. At least some of the operations included in the semiconductor process modeling method shown in FIGS. 25 to 31 may be performed by the computer system 182. The computer system 182 may access the computer-readable medium 184 and may execute a program 184_1 stored in the computer-readable medium 184. In some embodiments, the computer system 182 and the computer-readable medium 184 may be collectively referred to as a semiconductor process modeling system MS (see FIG. 1).

The computer system 182 may include at least one computer subsystem, and the program 184_1 may include at least one component executed by at least one computer subsystem. For example, at least one component may include the preprocessing component 1200 (see FIG. 1) and the modeling component 1300 (see FIG. 1). Similar to the storage 176 of FIG. 5, the computer-readable medium 184 may include a non-volatile memory device, or a storage medium such as a magnetic tape, an optical disk, and a magnetic disk. Further, the computer-readable medium 184 may be removable from the computer system 182.

Figure 7:
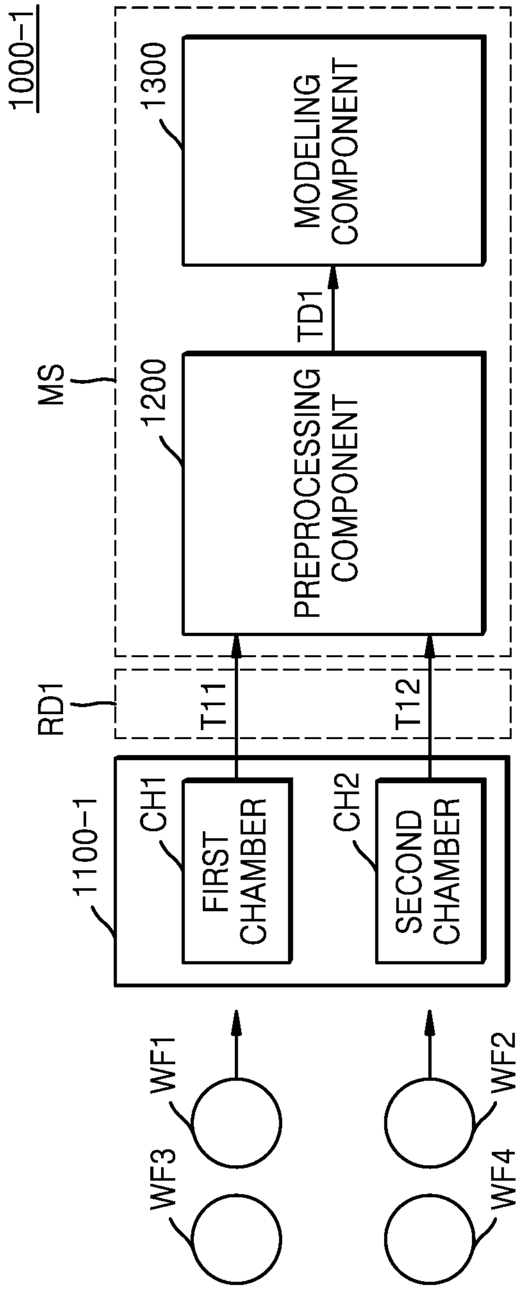
FIG. 7 is a diagram of operations of a semiconductor manufacturing system, according to example embodiments.
Figure 9:
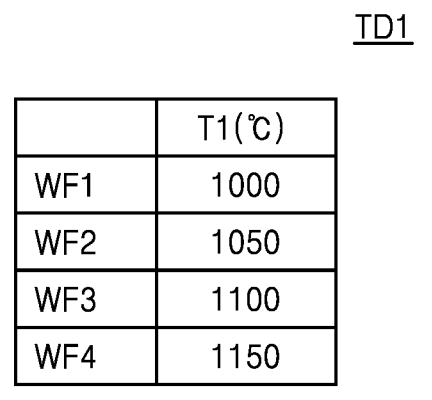

FIG. 7 is a diagram of operations of a semiconductor manufacturing system 1000-1 according to example embodiments. FIG. 8 is a diagram of raw data RD1 generated by the operations of FIG. 7. FIG. 9 is a diagram of tensor data TD1 generated by the operations of FIG. 7.

With reference to FIGS. 7 to 9, semiconductor manufacturing equipment 1100-1 may include a first chamber CH1 and a second chamber CH2. The semiconductor manufacturing equipment 1100-1 may process some of the first to fourth wafers WF1 to WF4, for example, the first wafer WF1 and the third wafer WF3, in the first chamber CH1. The semiconductor manufacturing equipment 1100-1 may process some of the first to fourth wafers WF1 to WF4, for example, the second wafer WF2 and the fourth wafer WF4, in the second chamber CH2. The semiconductor manufacturing equipment 1100-1 may be any one of the first to eighth semiconductor manufacturing equipment **1100*a* through 1100*h* of FIG. 1**.

The preprocessing component 1200 may obtain a value of a first process parameter T11 from the first chamber CH1 of the semiconductor manufacturing equipment 1100-1 in which the first wafer WF1 and the third wafer WF3 are sequentially processed. Further, the preprocessing component 1200 may obtain a value of a second process parameter T12 from the second chamber CH2 of the semiconductor manufacturing equipment 1100-1 in which the second wafer WF2 and the fourth wafer WF4 are sequentially processed. For example, the first process parameter T11 may be a temperature of the first chamber CH1, and the second process parameter T12 may be a temperature of the second chamber CH2.

In this case, the raw data RD1 may include the value of the first process parameter T11 for each of the first wafer WF1 and the third wafer WF3, and the value of the second process parameter T12 for each of the second wafer WF2 and the fourth wafer WF4. On the contrary, the raw data RD1 may not include the value of the second process parameter T12 for each of the first wafer WF1 and the third wafer WF3, and the value of the first process parameter T11 for each of the second wafer WF2 and the fourth wafer WF4.

The preprocessing component 1200 may generate the tensor data TD1 by merging the first process parameter T11 and the second process parameter T12 into one preprocessed process parameter T1. For example, a value of the preprocessed process parameter T1 for the first wafer WF1 may be identical to a value of the first process parameter T11 for the first wafer WF1, a value of the preprocessed process parameter T1 for the second wafer WF2 may be identical to a value of the second process parameter T12 for the second wafer WF2, a value of the preprocessed process parameter T1 for the third wafer WF3 may be identical to a value of the first process parameter T11 for the third wafer WF3, and a value of the preprocessed process parameter T1 for the fourth wafer WF4 may be identical to a value of the second process parameter T12 for the fourth wafer WF4. The preprocessing component 1200 may provide the generated tensor data TD1 to the modeling component 1300 for further processing.

Figure 10:
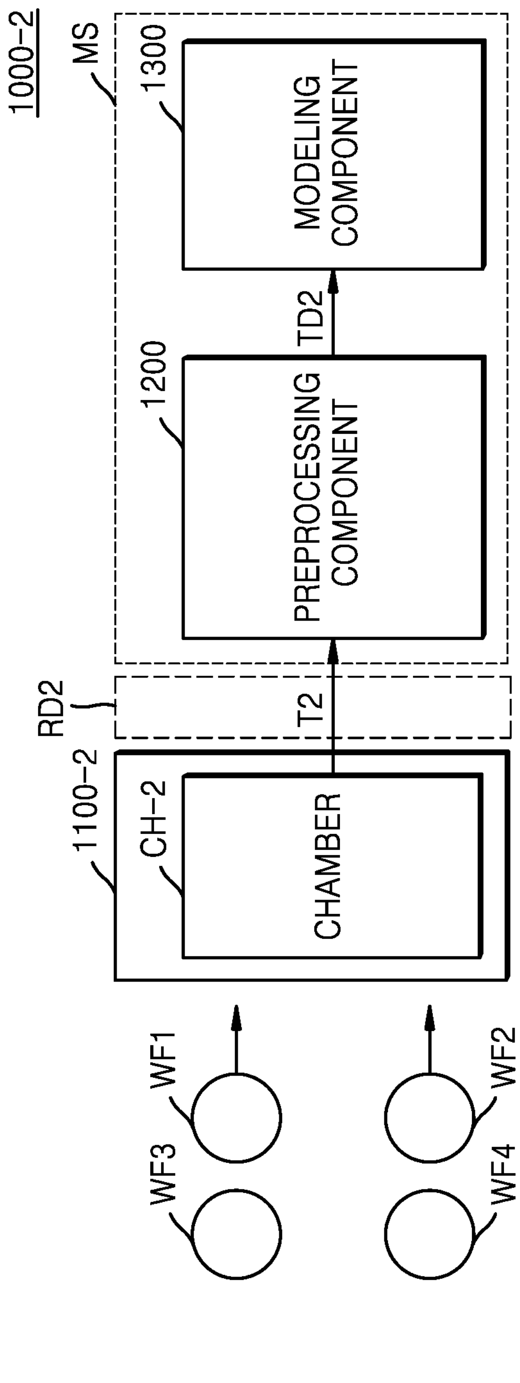
FIG. 10 is a diagram of operations of a semiconductor manufacturing system, according to example embodiments.
Figure 11:
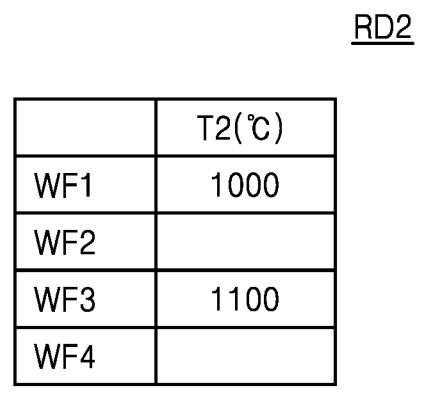
Figure 12:
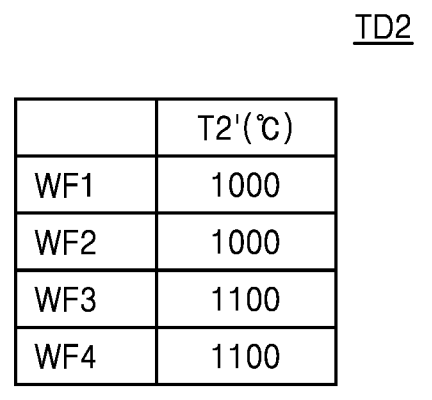

FIG. 10 is a diagram of operations of a semiconductor manufacturing system 1000-2 according to example embodiments. FIG. 11 is a diagram of raw data RD2 generated by the operations of FIG. 10. FIG. 12 is a diagram of tensor data TD2 generated by the operations of FIG. 10.

The semiconductor manufacturing equipment 1100-2 may include a chamber CH-2. The chamber CH-2 may accommodate two wafers at the same time. The semiconductor manufacturing equipment 1100-2 may simultaneously process the first wafer WF1 and the second wafer WF2 in the chamber CH-2. Further, the semiconductor manufacturing equipment 1100-2 may simultaneously process the third wafer WF3 and the fourth wafer WF4 in the chamber CH-2. The semiconductor manufacturing equipment 1100-2 may be any one of the first to eighth semiconductor manufacturing equipment 1100*a* through 1100*h* of FIG. 1.

The preprocessing component 1200 may obtain the value of the process parameter T2 from the chamber CH-2. In some embodiments, the process parameter T2 may be a temperature of the chamber CH-2.

In this case, the raw data RD2 may include a value of the process parameter T2 for the first wafer WF1, not include a value of the process parameter T2 for the second wafer WF2, include a value of the process parameter T2 for the third wafer WF3, and not include a value of the process parameter T2 for the fourth wafer WF4.

The preprocessing component 1200 may generate the tensor data TD2 by replicating the value of the process parameter T2 for the first wafer WF1 as a value of a preprocessed process parameter T2' for each of the first wafer WF1 and the second wafer WF2, and replicating the value of the process parameter T2 for the third wafer WF3 as a value of a preprocessed process parameter T2' for each of the third wafer WF3 and the fourth wafer WF4. For example, the value of the preprocessed process parameter T2' for each of the first wafer WF1 and the second wafer WF2 may be identical to the value of the process parameter T2 for the first wafer WF1, and the value of the preprocessed process parameter T2' for each of the third wafer WF3 and the fourth wafer WF4 may be identical to the value of the process parameter T2 for the third wafer WF3. The preprocessing component 1200 may provide the generated tensor data TD2 to the modeling component 1300 for further processing.

Figure 13:
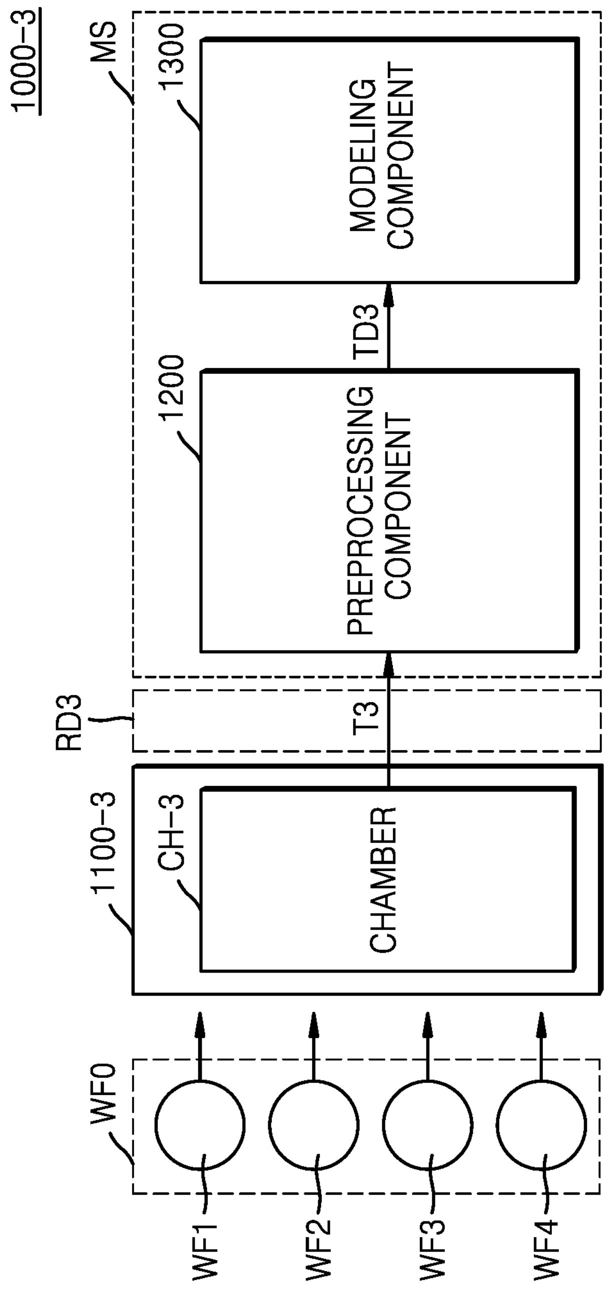
FIG. 13 is a diagram of operations of a semiconductor manufacturing system, according to example embodiments.
Figure 14:
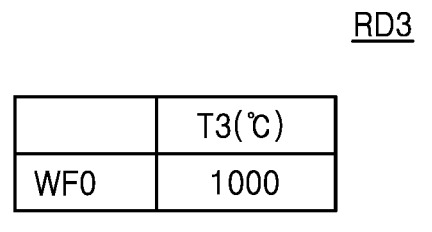
Figure 15:
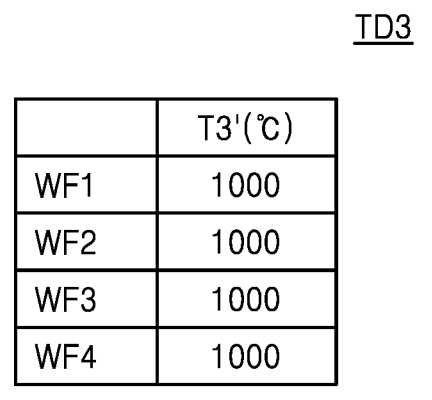

FIG. 13 is a diagram of operations of a semiconductor manufacturing system 1000-3 according to example embodiments. FIG. 14 is a diagram of raw data RD3 generated by the operations of FIG. 13. FIG. 15 is a diagram of tensor data TD3 generated by the operations of FIG. 13.

With reference to FIGS. 13 to 15, the semiconductor manufacturing equipment 1100-3 may include a chamber CH-3, and the semiconductor manufacturing equipment 1100-3 may process a lot WF0 including the first to fourth wafers WF1 to WF4 in the chamber CH-3. For example, the semiconductor manufacturing equipment 1100-3 may simultaneously process the first to fourth wafers WF1 to WF4 in the chamber CH-3. The semiconductor manufacturing equipment 1100-3 may be any one of the first to eighth semiconductor manufacturing equipment 1100*a* through 1100*h* of FIG. 1.

The preprocessing component 1200 may obtain a value of the process parameter T3 from the chamber CH-3 of the semiconductor manufacturing equipment 1100-3 in which the lot WF0 is processed. Here, the process parameter T3 may be a temperature of the chamber CH-3.

In this case, the raw data RD3 may include a value of the process parameter T3 for the lot WF0 and may not include a value of the process parameter T3 for the first to fourth wafers WF1 to WF4.

The preprocessing component 1200 may generate the tensor data TD3 by replicating the value of the process parameter T3 for the lot WF0 as a value of a preprocessed process parameter T3' for each of the first to fourth wafers WF1 to WF4. For example, the value of the preprocessed process parameter T3' for each of the first to fourth wafers WF1 to WF4 may be identical to the value of the process parameter T3 for the lot WF0. The preprocessing component 1200 may provide the generated tensor data TD3 to the modeling component 1300 for further processing.

Although FIGS. 13-15 illustrate a lot including four wafers (e.g., first to fourth wafers WF1 to WF4), the number of wafers in a lot may be greater or fewer. For example, lot WF0 may include two wafers (e.g., first and second wafer WF1 and WF2), three wafers (e.g., first through third wafers WF1 to WF3), or more than four wafers (e.g., first wafer WF1 through n-th wafer WFn).

Figure 16:
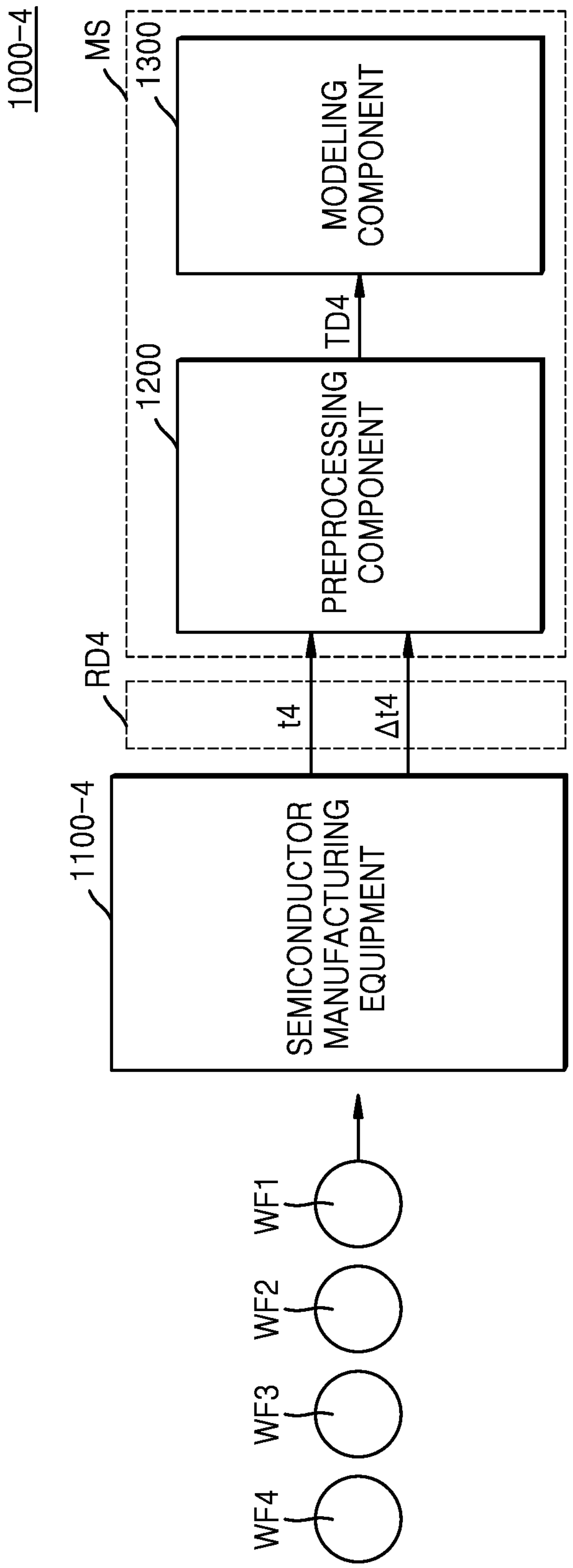
FIG. 16 is a diagram of operations of a semiconductor manufacturing system, according to example embodiments.
Figure 18:
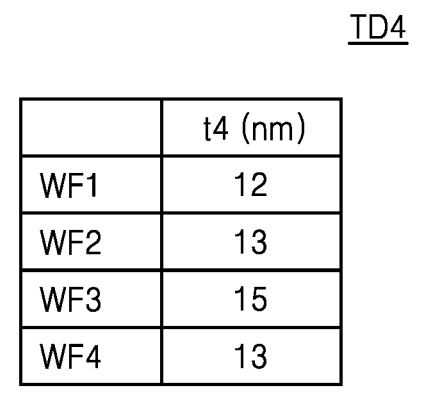

FIG. 16 is a diagram of operations of a semiconductor manufacturing system 1000-4 according to example embodiments. FIG. 17 is a diagram of raw data RD4 generated by the operations of FIG. 16. FIG. 18 is a diagram of tensor data TD4 generated by the operations of FIG. 14.

With reference to FIGS. 16 to 18, the semiconductor manufacturing equipment 1100-4 may sequentially process the first to fourth wafers WF1 to WF4. The semiconductor manufacturing equipment 1100-4 may be any one of the first to eighth semiconductor manufacturing equipment 1100*a* through 1100*h* of FIG. 1. The preprocessing component 1200 may obtain a first process parameter t4 and a second process parameter Δt4 from the semiconductor manufacturing equipment 1100-3. The first process parameter t4 may be a thickness of a thin film on a wafer, and the second process parameter Δt4 may be a thickness difference between a thin film of the first wafer WF1 and a thin film of a certain wafer other than the first wafer WF1.

The raw data RD4 may include a value of the first process parameter t4 for the first wafer WF1, but not include a value of the second process parameter Δt4 for the first wafer WF1, and include a value of the first process parameter t4 and the second process parameter Δt4 for the second wafer WF2, a value of the first process parameter t4 and the second process parameter Δt4 for the third wafer WF3, and a value of the first process parameter t4 and the second process parameter Δt4 for the fourth wafer WF4. For example, when the raw data RD4 is expressed as a raw matrix, an element corresponding to the value of the second process parameter Δt4 for the first wafer WF1 may be omitted.

The values of the second process parameter Δt4 for the second to fourth wafers WF2 to WF4 may be calculated from the values of the first process parameter t4 for the first to fourth wafers WF1 to WF4. For example, when the first process parameter t4 is a thickness of a thin film on a wafer, and the second process parameter Δt4 is a thickness difference between a thin film on the first wafer WF1 and a thin film on a certain wafer, the value of the second process parameter Δt4 for the second wafer WF2 may be calculated by subtracting the value of the first process parameter t4 for the first wafer WF1 from the value of the first process parameter t4 for the second wafer WF2. Similarly, the value of the second process parameter Δt4 for the third wafer WF3 may be calculated by subtracting the value of the first process parameter t4 for the first wafer WF1 from the value of the first process parameter t4 for the third wafer WF3. Also, the value of the second process parameter Δt4 for the fourth wafer WF4 may be calculated by subtracting the value of the first process parameter t4 for the first wafer WF1 from the value of the first process parameter t4 for the fourth wafer WF4.

The preprocessing component 1200 may generate the tensor data TD4 by deleting the value of the second process parameter Δt4 for the second wafer WF2. For example, the tensor data TD4 may include the value of the first process parameter t4 for each of the first to fourth wafers WF1 to WF4, and may not include the value of the second process parameter Δt4 for any of the first to fourth wafers WF1 to WF4. The preprocessing component 1200 may provide the generated tensor data TD4 to the modeling component 1300 for further processing.

FIGS. 7 to 18 illustrate examples in which when raw data is expressed as a raw matrix, the raw matrix has omitted elements, and examples in which tensor data is generated from raw data based on at least one of characteristics of semiconductor manufacturing equipment and characteristics of parameters. However, there may be various examples in which when raw data is expressed as a raw matrix, the raw matrix has omitted elements, in addition to the examples illustrated in FIGS. 7 to 18. Further, there may be various examples in which tensor data is generated from raw data based on at least one of characteristics of semiconductor manufacturing equipment and characteristics of parameters, in addition to the examples illustrated in FIGS. 7 to 18.

Figure 19:
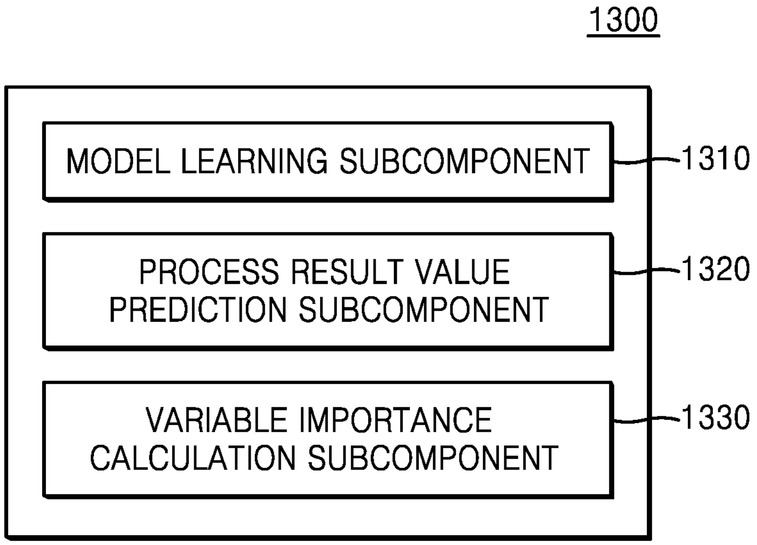
FIG. 19 is a block diagram of modeling components, according to example embodiments.
Figure 20:
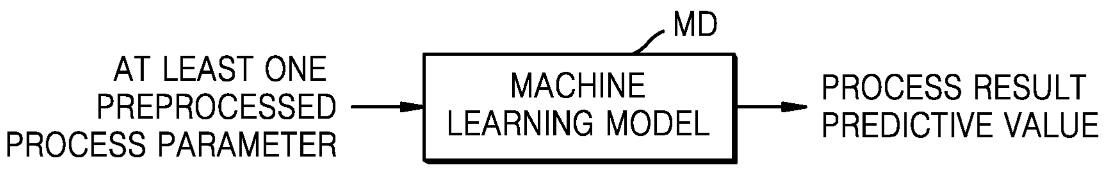
FIG. 20 is a conceptual diagram of operations of a modeling component, according to example embodiments.
Figure 21:
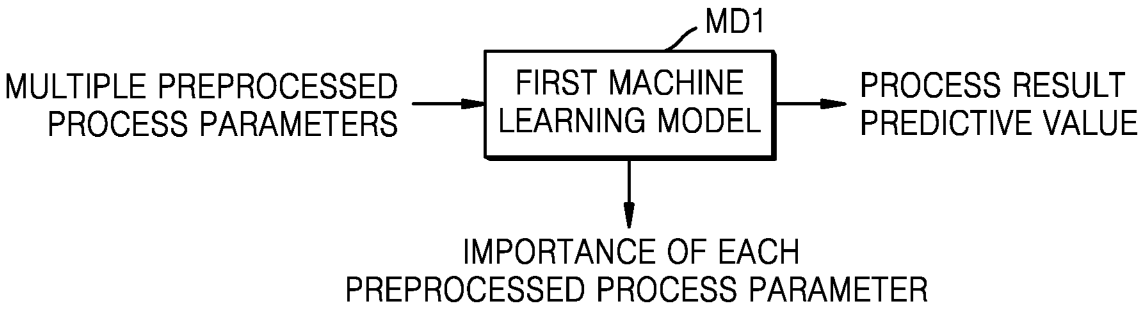
FIG. 21 is a conceptual diagram of operations of a modeling component, according to example embodiments.
Figure 22:
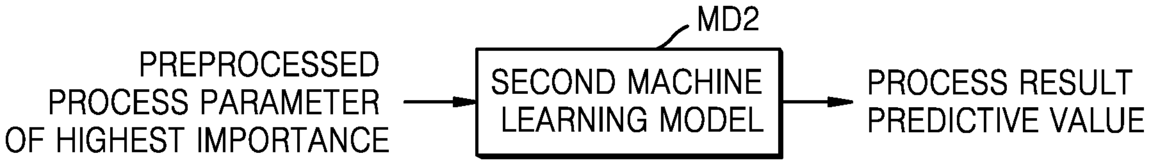
FIG. 22 is a conceptual diagram of operations of a modeling component, according to example embodiments.

FIG. 19 is a block diagram of a modeling component 1300 according to example embodiments. FIG. 20 is a conceptual diagram of operations of a modeling component 1300 according to example embodiments. FIG. 21 is a conceptual diagram of operations of a modeling component 1300 according to example embodiments. FIG. 22 is a conceptual diagram of operations of a modeling component 1300 according to example embodiments.

With reference to FIGS. 19 to 22, the modeling component 1300 may include a model learning subcomponent 1310, a process result value prediction subcomponent 1320, and a variable importance calculation subcomponent 1330.

The model learning subcomponent 1310 may generate a machine learning model MD and train the machine learning model MD. The machine learning model MD may include, for example, a linear regression model, a support vector machine model, a decision tree model, a random forest model, an XG Boost model, or a Gradient Boost model, etc.

The model learning subcomponent 1310 may train the machine learning model MD by using supervised learning, semi-supervised learning, unsupervised learning, or combinations thereof. The model learning subcomponent 1310 may be trained to output a process result predictive value from at least one preprocessed process parameter.

The process result value prediction subcomponent 1320 may predict a process result value from at least one preprocessed process parameter by using the machine learning model MD trained by the model learning subcomponent 1310 as shown in FIG. 20.

The variable importance calculation subcomponent 1330 may calculate importance of each preprocessed process parameter from a first machine learning model MD1 trained to predict a process result predictive value from a plurality of preprocessed process parameters by using the first machine learning model MD1 trained by the model learning subcomponent 1310 as shown in FIG. 21. A preprocessed process parameter of high importance may have a greater effect on a process result value.

In addition, the model learning subcomponent 1310 may train a second machine learning model MD2 to predict a process result value from a preprocessed process parameter having the highest importance among the plurality of preprocessed process parameters. The process result value prediction subcomponent 1320 may predict a process result value from a preprocessed process parameter having the highest importance by using the second machine learning model MD2 trained by the model learning subcomponent 1310 as shown in FIG. 22.

Figure 23:
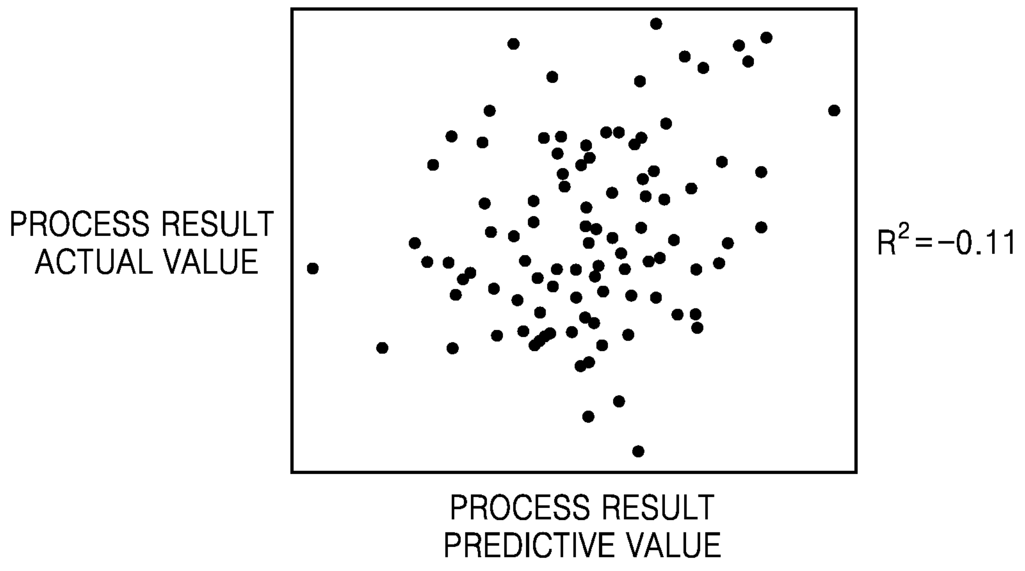
FIG. 23 is a diagram of modeling results, according to a comparative example.

FIG. 23 is a diagram of modeling results according to a comparative example.

With reference to FIG. 23, the process result value is predicted by using a machine learning model trained based on raw data without converting the raw data into the tensor data. The XGBoost model has been used as a machine running model. In FIG. 23, the X axis represents a predictive value of a process result, and the Y axis represents an actual value of the process result. The $R^2$ value representing the correlation between the predictive value and the actual value of the process result has been calculated as −0.11. The $R^2$ having a negative value means that there is no correlation between the predictive value and the actual value of the process result. For example, a machine learning model trained based on raw data without converting the raw data into tensor data may not predict process result values accurately.

Figure 24:
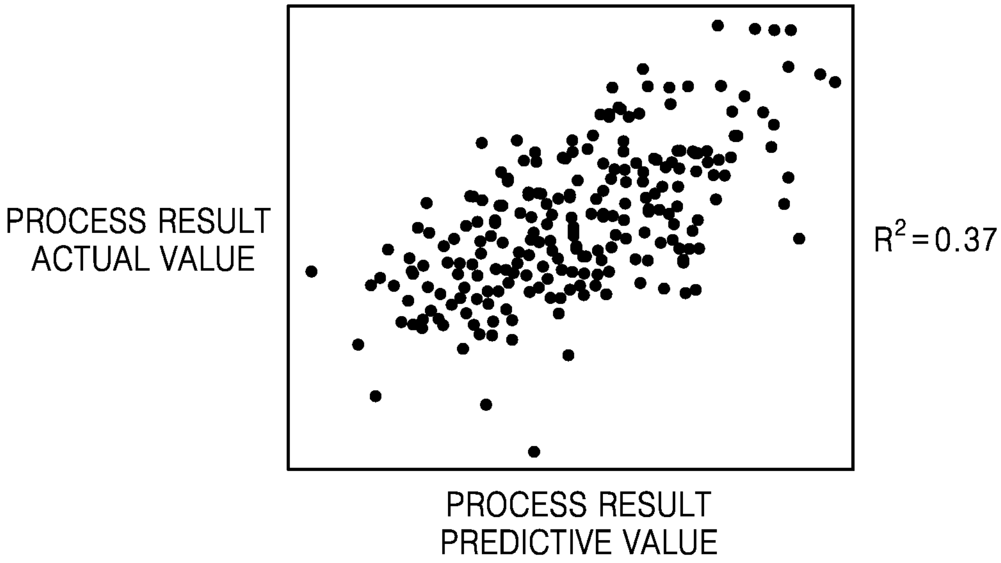
FIG. 24 is a diagram of modeling results, according to an example embodiment.

FIG. 24 is a diagram of modeling results according to an example embodiment.

With reference to FIG. 24, a process result value is predicted by using a machine learning model trained based on the tensor data. The XGBoost model has been used as a machine running model. In FIG. 24, the X axis represents a predictive value of a process result, and the Y axis represents an actual value of the process result. The $R^2$ value representing the correlation between the predictive value and the actual value of the process result has been calculated as 0.37. Such value indicates that there is significant correlation between the predictive value and the actual value of the process result. For example, a machine learning model trained based on the tensor data has successfully predicted a process result value. Upon comparing the comparative example of FIG. 23 to the embodiment of FIG. 24, it is understood that a user may obtain a high performance model more easily through the semiconductor process modeling system converting the raw data into the tensor data.

Figure 25:
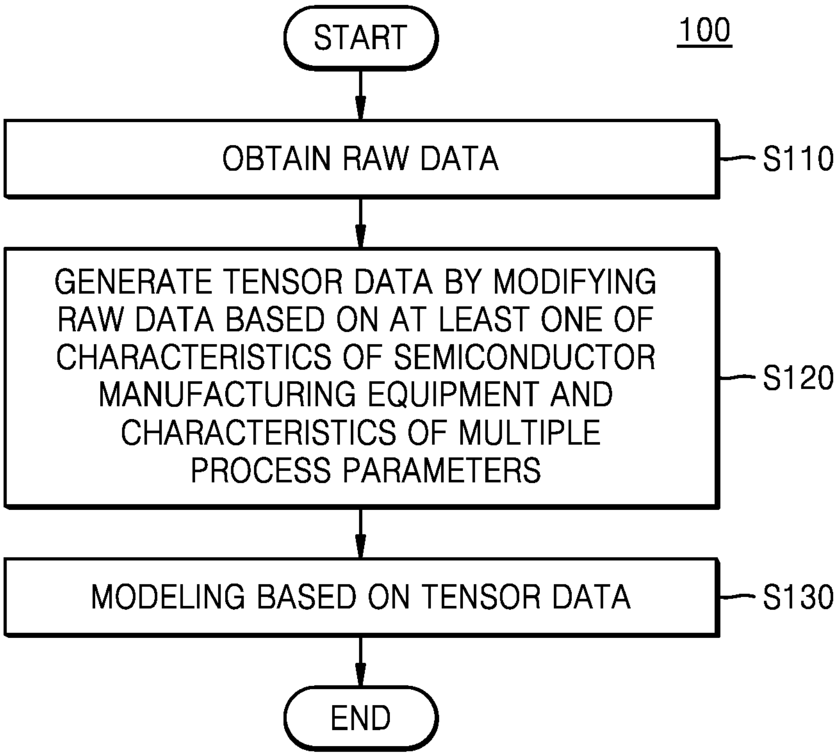
FIG. 25 is a flowchart of a semiconductor process modeling method, according to example embodiments.

FIG. 25 is a flowchart of a semiconductor process modeling method 100 according to example embodiments.

With reference to FIG. 25 and FIGS. 1-3, the raw data RD including values of a plurality of process parameters may be obtained from the first to eighth semiconductor manufacturing equipment 1100*a* to 1100*h* (S110). Then, the tensor data TD may be generated by modifying the raw data RD based on at least one of characteristics of the first to eighth semiconductor manufacturing equipment 1100*a* to 1100*h* and characteristics of the plurality of process parameters (S120). Next, modeling may be performed based on the tensor data TD (S130).

Figure 26:
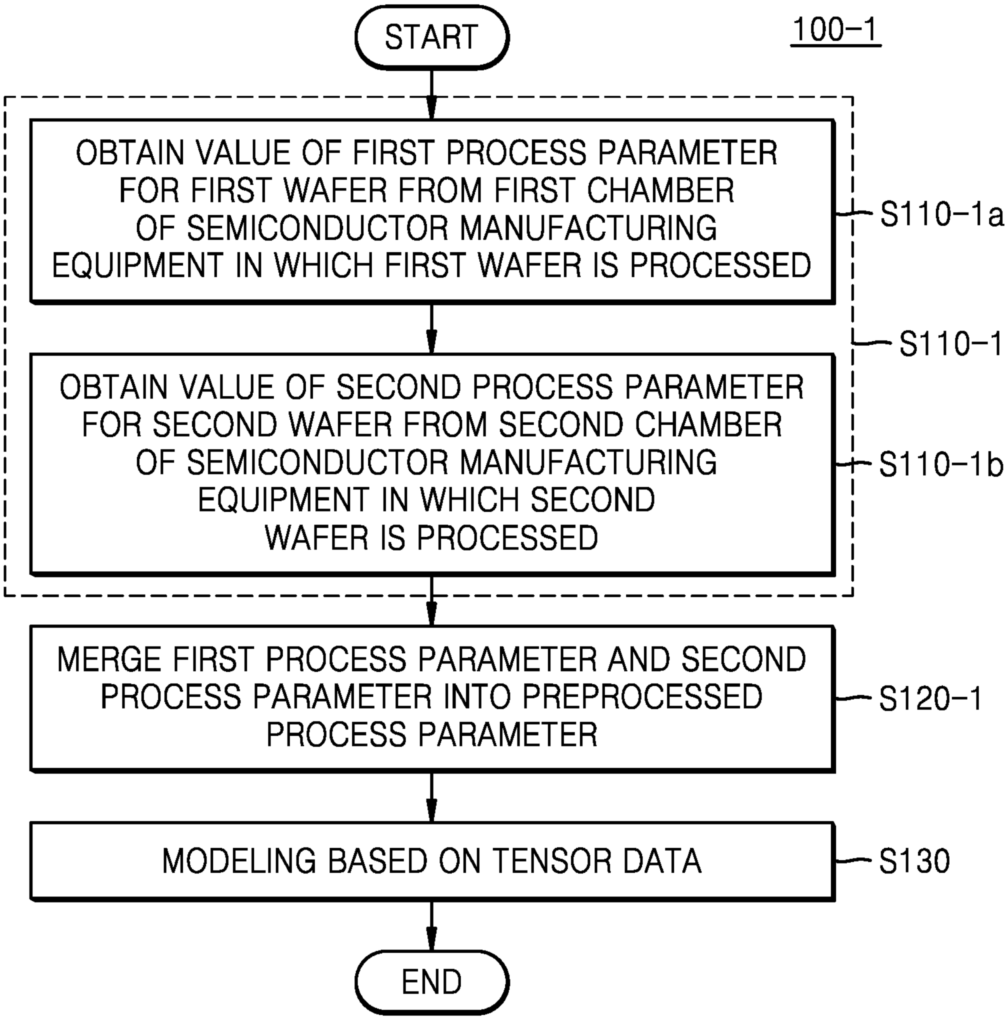
FIG. 26 is a flowchart of a semiconductor process modeling method, according to example embodiments.

FIG. 26 is a flowchart of a semiconductor process modeling method 100-1 according to example embodiments.

With reference to FIG. 26 and FIGS. 7-9, operation S110-1 for acquiring the raw data may include operation S110-1*a* for obtaining a value of the first process parameter T11 for the first wafer WF1 from the first chamber CH1 of the semiconductor manufacturing equipment 1100-1, and operation S110-1*b* for obtaining a value of the second process parameter T12 for the second wafer WF2 from the second chamber CH2 of the semiconductor manufacturing equipment in which the second wafer WF2 is processed. In some embodiments, operation S110-1*a* for obtaining the value of the first process parameter T11 and the operation S110-1*b* for obtaining the value of the second process parameter T12 may be performed simultaneously. Next, the tensor data TD1 may be generated by merging the first process parameter T11 and the second process parameter T12 into a preprocessed process parameter (S120-1). Then, modeling may be performed based on the tensor data TD1 (S130).

Figure 27:
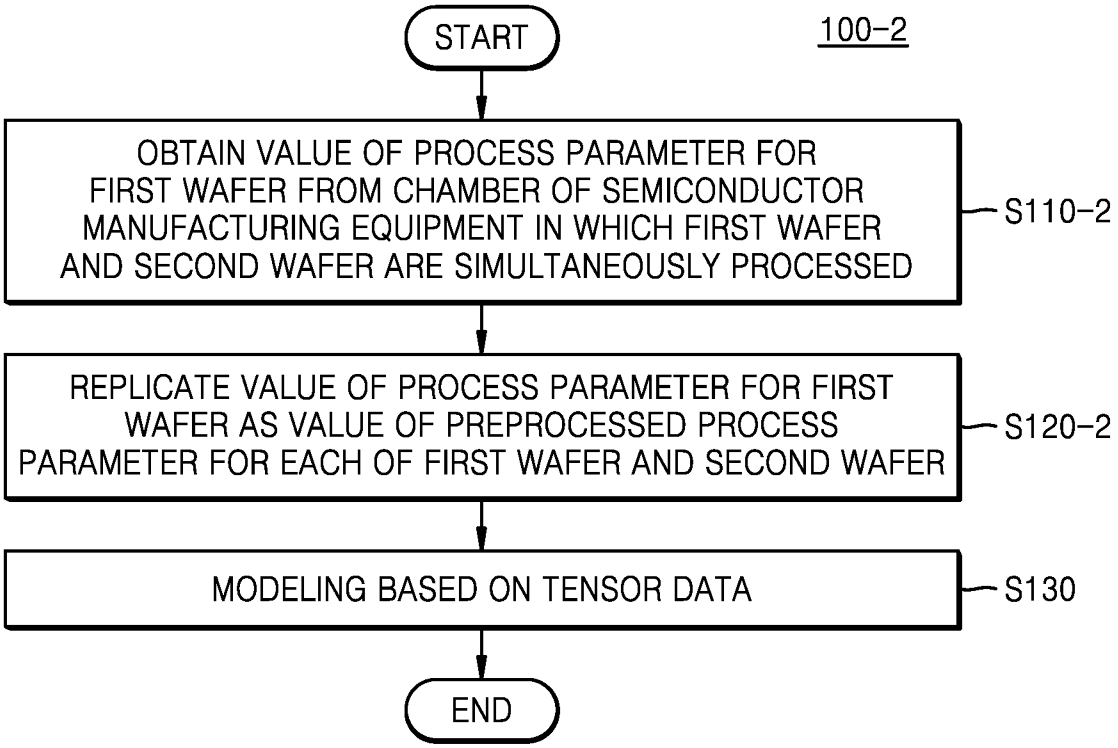
FIG. 27 is a flowchart of a semiconductor process modeling method, according to example embodiments.

FIG. 27 is a flowchart of a semiconductor process modeling method 100-2 according to example embodiments.

Figure 28:
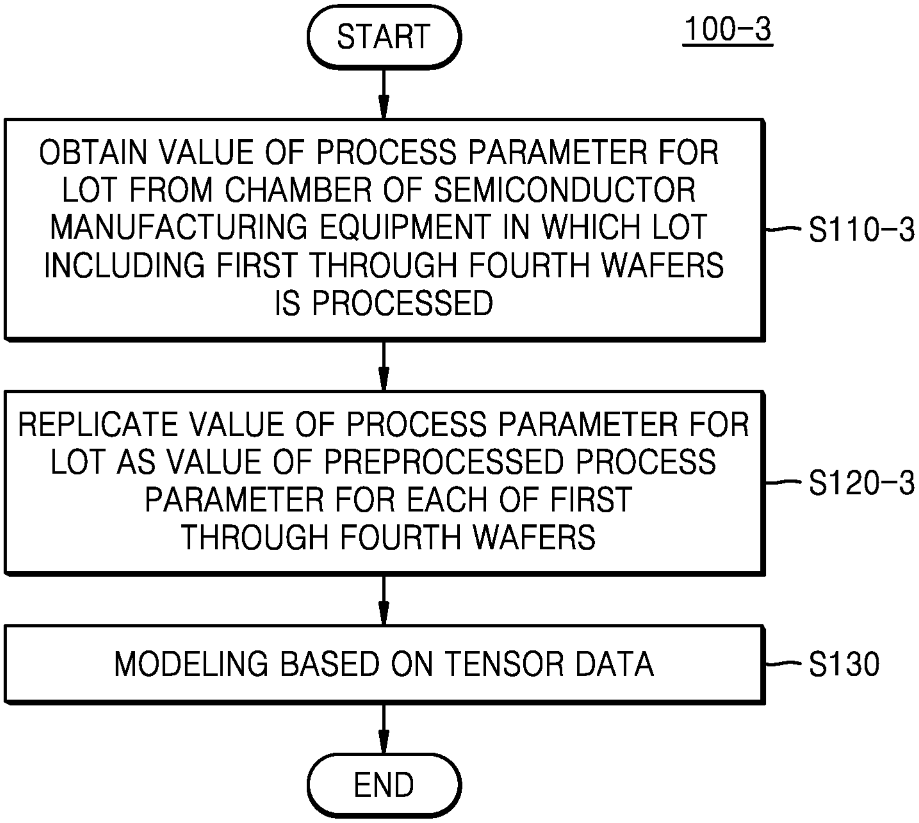
FIG. 28 is a flowchart of a semiconductor process modeling method, according to example embodiments.

With reference to FIG. 27 and FIGS. 10-12, the raw data may be obtained by obtaining a value of a process parameter for the first wafer WF1 from the chamber CH-2 of the semiconductor manufacturing equipment 1100-2 in which the first wafer WF1 and the second wafer WF2 are processed simultaneously (S110-2). Next, the tensor data TD2 may be generated by replicating a value of the process parameter T2 for the first wafer WF1 as a value of the preprocessed process parameter T2' for each of the first wafer WF1 and the second wafer WF2 (S120-2). Then, modeling may be performed based on the tensor data TD2 (S130). FIG. 28 is a flowchart of a semiconductor process modeling method 100-3 according to example embodiments.

With reference to FIG. 28 and FIGS. 13-15, the raw data may be obtained by obtaining a value of the process parameter T3 from the chamber CH-3 of the semiconductor manufacturing equipment 1100-3 in which the lot WF0 including the first through fourth wafers WF1 to WF4 is processed (S110-3). Next, the tensor data TD3 may be generated by replicating a value of the process parameter T3 for the lot WF0 as a value of the preprocessed process parameter T3' for each of the first through fourth wafers WF1 to WF4. Then, modeling may be performed based on the tensor data TD3 (S130).

Figure 29:
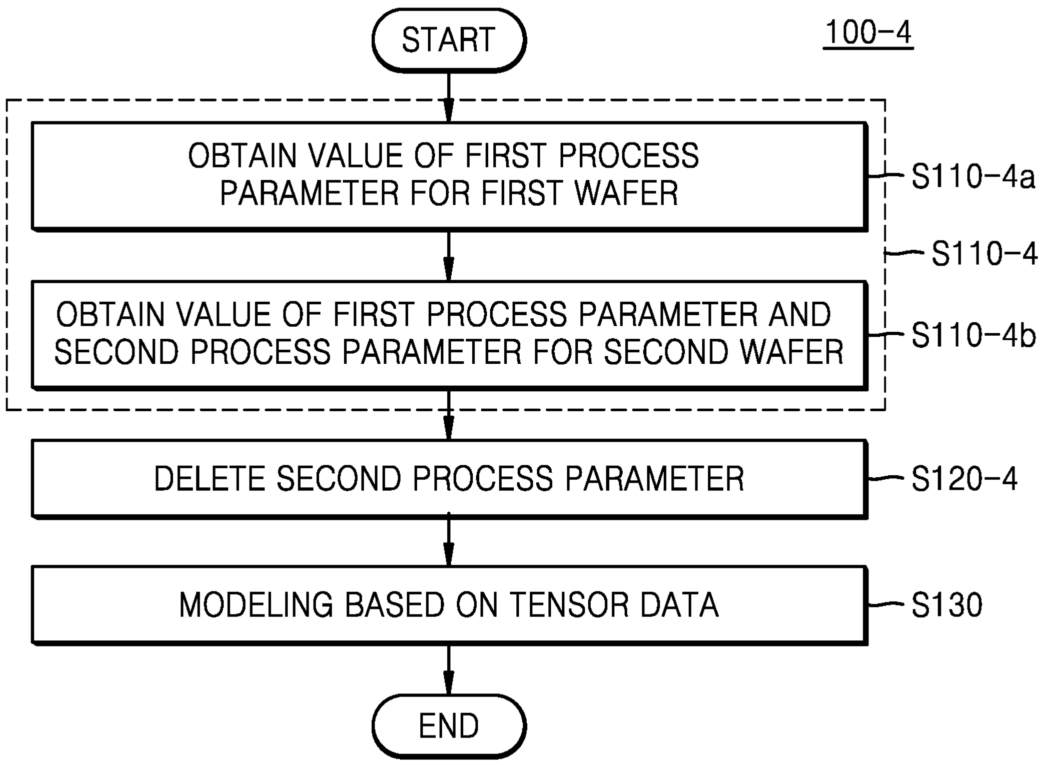
FIG. 29 is a flowchart of a semiconductor process modeling method, according to example embodiments.

FIG. 29 is a flowchart of a semiconductor process modeling method 100-4 according to example embodiments.

With reference to FIG. 29 and FIGS. 16-18, operation S110-4 to obtain the raw data may include operation S110-4*a* to obtain a value of the first process parameter t4 for the first wafer WF1 and operation S110-4*b* to obtain a value of the first process parameter t4 and the second process parameter Δt4 for the second wafer WF2. Next, the tensor data TD4 may be generated by deleting the second process parameter Δt4 for the second wafer WF2 (S120-4). Then, modeling may be performed based on the tensor data TD4 (S130).

In some embodiments, operation S110-4*b* may be performed for the third wafer WF3 and the fourth wafer WF4. For example, in operation S110-4*b*, values of the first process parameter t4 and the second process parameter Δt4 for the second through fourth wafers WF2 to WF4 may be obtained. In such embodiments, in operation S120-4, the tensor data TD4 may be generated by deleting the second process parameters Δt4 for each of the second through fourth wafers WF2 to WF4.

Figure 30:
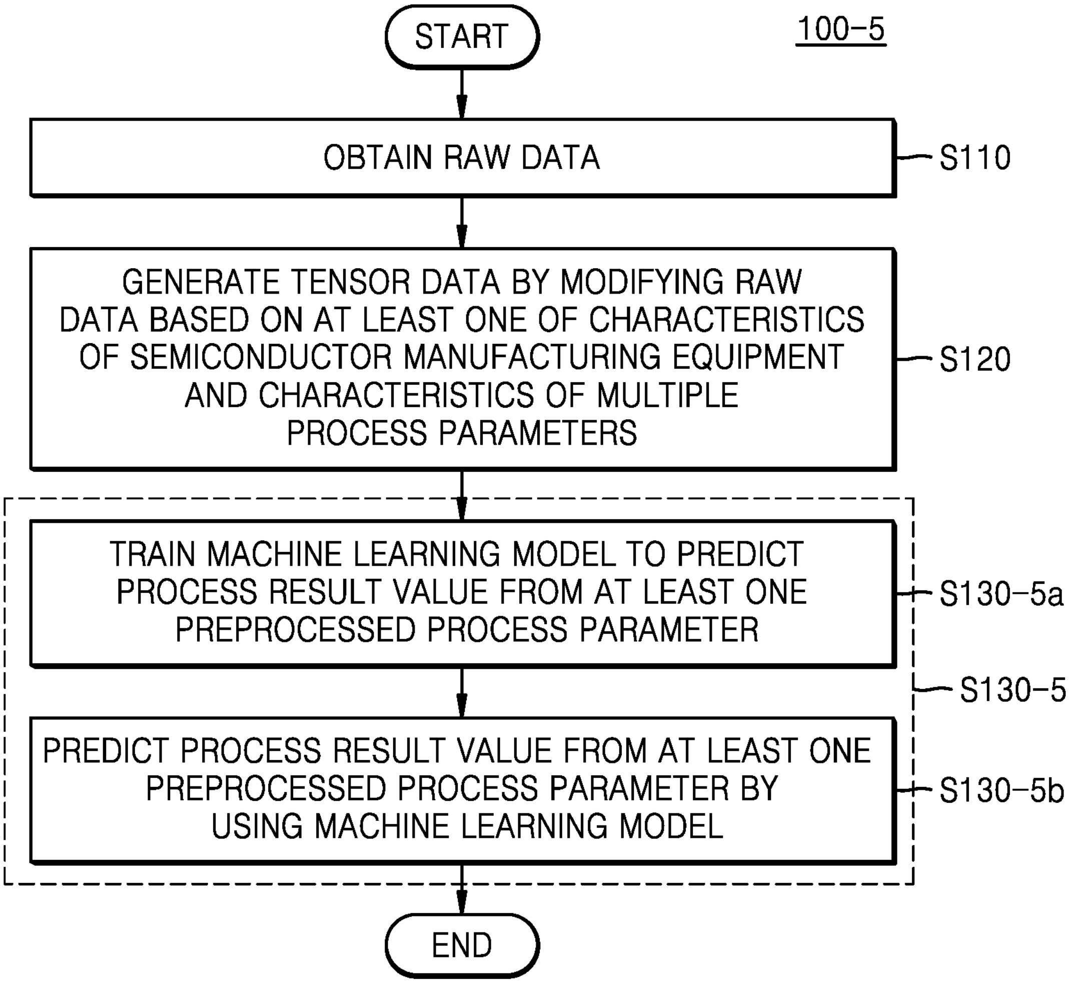
FIG. 30 is a flowchart of a semiconductor process modeling method, according to example embodiments.

FIG. 30 is a flowchart of a semiconductor process modeling method 100-5 according to example embodiments.

With reference to FIGS. 30 and 20, the raw data may be obtained (S110) and the tensor data may be generated from the raw data (S120). Next, the modeling operation S130-5 may include operation S130-5*a* for training the machine learning model MD to predict a process result value from at least one preprocessed process parameter and operation S130-5*b* for predicting a process result value from at least one preprocessed process parameter by using the machine learning model MD.

Figure 31:
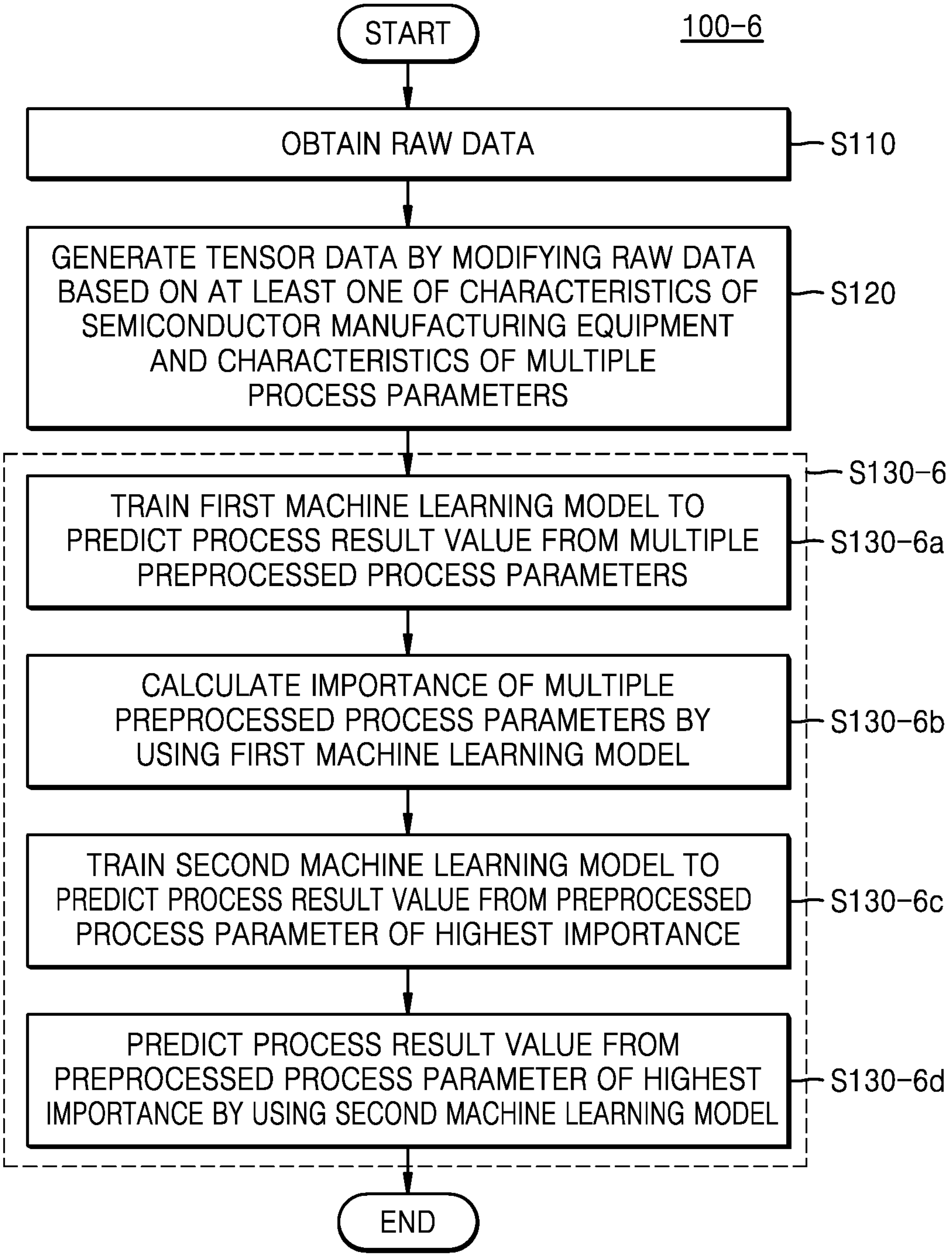
FIG. 31 is a flowchart of a semiconductor process modeling method, according to example embodiments.

FIG. 31 is a flowchart of a semiconductor process modeling method 100-6 according to example embodiments.

With reference to FIGS. 31, 21, and 22, the raw data may be obtained (S110) and the tensor data may be generated from the raw data (S120). Next, the modeling operation S130-6 may include operation S130-6*a* for training the first machine learning model MD1 to predict a process result value from a plurality of preprocessed process parameters, operation S130-6*b* for calculating importance of the plurality of preprocessed process parameters by using the first machine learning model MD1, operation S130-6*c* for training the second machine learning model MD2 to predict a process result value from a preprocessed process parameter having the highest importance among the plurality of preprocessed process parameters, and operation S130-6*d* for predicting a process result value from the preprocessed process parameter having the highest importance by using the second machine learning model MD2.

While the inventive concept has been particularly shown and described with reference to embodiments thereof, it will be understood that various changes in form and details may be made therein without departing from the spirit and scope of the following claims.

What is claimed is:

1. A semiconductor process modeling system comprising:

a preprocessing component configured to generate tensor data from raw data obtained from semiconductor manufacturing equipment, wherein, when the raw data is expressed as a raw matrix representing values of a plurality of process parameters for each of a plurality of wafers, at least one element of the raw matrix is omitted, wherein, when the tensor data is expressed as a tensor matrix representing values of a plurality of preprocessed process parameters for each of the plurality of wafers, a number of omitted elements of the tensor matrix is less than a number of omitted elements of the raw matrix, and wherein the preprocessing component is configured to generate the tensor data by modifying the raw data based on characteristics of the plurality of process parameters for each of the plurality of wafers.

2. The semiconductor process modeling system of claim 1, wherein the number of omitted elements of the tensor matrix is 0.

3. The semiconductor process modeling system of claim 1, wherein the raw data includes a value of a first process parameter for a first wafer and a value of a second process parameter for a second wafer, and wherein the preprocessing component is configured to generate the tensor data from the raw data so that a value of a preprocessed process parameter for the first wafer is identical to the value of the first process parameter for the first wafer, and a value of the preprocessed process parameter for the second wafer is identical to the value of the second process parameter for the second wafer.

4. The semiconductor process modeling system of claim 3, wherein the preprocessing component is configured to obtain the value of the first process parameter from a first chamber of semiconductor manufacturing equipment in which the first wafer is processed, and obtain the value of the second process parameter from a second chamber of the semiconductor manufacturing equipment in which the second wafer is processed.

5. The semiconductor process modeling system of claim 1, wherein the raw data includes a value of a process parameter for a first wafer, and wherein the preprocessing component is configured to generate the tensor data from the raw data so that a value of a preprocessed process parameter for each of the first wafer and a second wafer is identical to the value of the process parameter for the first wafer.

6. The semiconductor process modeling system of claim 5, wherein the preprocessing component is configured to obtain the value of the process parameter from a chamber of semiconductor manufacturing equipment in which the first wafer and the second wafer are simultaneously processed.

7. The semiconductor process modeling system of claim 1, wherein the raw data includes a value of a process parameter for a lot including a first wafer and a second wafer, and wherein the preprocessing component is configured to generate the tensor data from the raw data so that a value of a preprocessed process parameter for each of the first wafer and the second wafer is identical to the value of the process parameter for the lot.

8. The semiconductor process modeling system of claim 7, wherein the preprocessing component is configured to obtain the value of the process parameter from a chamber of semiconductor manufacturing equipment in which the lot is processed.

9. The semiconductor process modeling system of claim 1, wherein the raw data includes a value of a first process parameter for a first wafer and a value of the first process parameter and a second process parameter for a second wafer, and wherein the preprocessing component is configured to generate the tensor data from the raw data so that the tensor data includes the value of the first process parameter for each of the first wafer and the second wafer, and omits the value of the second process parameter for the second wafer.

10. The semiconductor process modeling system of claim 9, wherein, in the raw data, the value of the second process parameter for the second wafer is calculated from the value of the first process parameter for each of the first wafer and the second wafer.

11. The semiconductor process modeling system of claim 1, further comprising:

a modeling component including a model learning subcomponent configured to train a first machine learning model to predict a process result value from at least one of the plurality of preprocessed process parameters.

12. The semiconductor process modeling system of claim 11, wherein the modeling component further includes a variable importance calculation subcomponent configured to calculate importance of the plurality of preprocessed process parameters for the process result value by using the first machine learning model.

13. The semiconductor process modeling system of claim 12, wherein the model learning subcomponent is configured to train a second machine learning model to predict a process result value from a preprocessed process parameter of highest importance among the plurality of preprocessed process parameters.

14. A semiconductor manufacturing system comprising:

semiconductor manufacturing equipment configured to process a plurality of wafers; and a semiconductor process modeling system, wherein the semiconductor process modeling system includes:

a preprocessing component configured to generate tensor data from raw data obtained from the semiconductor manufacturing equipment; and a modeling component configured to model a semiconductor process by using the tensor data, wherein, when the raw data is expressed as a raw matrix representing values of a plurality of process parameters for each of the plurality of wafers, at least one element of the raw matrix is omitted, and wherein, when the tensor data is expressed as a tensor matrix representing values of a plurality of preprocessed process parameters for each of the plurality of wafers, a number of omitted elements of the tensor matrix is less than a number of omitted elements of the raw matrix, and wherein the preprocessing component is configured to generate the tensor data by modifying the raw data based on characteristics of the plurality of process parameters for each of the plurality of wafers.

15. The semiconductor manufacturing system of claim 14, wherein the raw data includes a value of a first process parameter for a first wafer and a value of a second process parameter for a second wafer, and wherein the preprocessing component is configured to generate the tensor data by merging the first process parameter and the second process parameter into one preprocessed process parameter.

16. The semiconductor manufacturing system of claim 15, wherein the semiconductor manufacturing equipment includes a first chamber and a second chamber, and is configured to process the first wafer in the first chamber and process the second wafer in the second chamber, and wherein the preprocessing component is configured to obtain a value of the first process parameter from the first chamber and a value of the second process parameter from the second chamber.

17. The semiconductor manufacturing system of claim 14, wherein the raw data includes a value of a process parameter for a first wafer, and wherein the preprocessing component is configured to generate the tensor data by replicating the value of the process parameter for the first wafer as a value of a preprocessed process parameter for each of the first wafer and a second wafer.

18. The semiconductor manufacturing system of claim 14, wherein the raw data includes a value of a process parameter for a lot including a first wafer and a second wafer, and wherein the preprocessing component is configured to generate the tensor data by replicating the value of the process parameter for the lot as a value of a preprocessed process parameter for each of the first wafer and the second wafer.

19. The semiconductor manufacturing system of claim 14, wherein the raw data includes a value of a first process parameter for a first wafer and a value of the first process parameter and a second process parameter for a second wafer, and wherein the preprocessing component is configured to generate the tensor data by deleting the value of the second process parameter for the second wafer.

20. A semiconductor process modeling method comprising:

obtaining raw data including values of a plurality of process parameters for each of a plurality of wafers from semiconductor manufacturing equipment; and generating tensor data by modifying the raw data based on characteristics of the plurality of process parameters for each of the plurality of wafers, wherein, when the raw data is expressed as a raw matrix representing values of the plurality of process parameters for each of the plurality of wafers, at least one element of the raw matrix is omitted, and wherein, when the tensor data is expressed as a tensor matrix representing values of a plurality of preprocessed process parameters for each of the plurality of wafers, a number of omitted elements of the tensor matrix is less than a number of omitted elements of the raw matrix.

* * * * *